US010582069B2

(12) United States Patent
Kinomoto

(10) Patent No.: US 10,582,069 B2
(45) Date of Patent: Mar. 3, 2020

(54) INFORMATION PROCESSING DEVICE AND DEVICE MANAGEMENT APPARATUS

(71) Applicant: Tsutomu Kinomoto, Kanagawa (JP)

(72) Inventor: Tsutomu Kinomoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/217,098

(22) Filed: Dec. 12, 2018

(65) Prior Publication Data

US 2019/0289143 A1    Sep. 19, 2019

(30) Foreign Application Priority Data

Mar. 19, 2018    (JP) .................................. 2018-051087

(51) Int. Cl.
*H04N 1/00*     (2006.01)
*G06F 3/12*     (2006.01)
*H04L 12/26*    (2006.01)

(52) U.S. Cl.
CPC ......... *H04N 1/00344* (2013.01); *G06F 3/122* (2013.01); *G06F 3/1231* (2013.01); *G06F 3/1236* (2013.01); *H04L 43/0811* (2013.01); *G06F 3/1284* (2013.01); *H04L 43/10* (2013.01)

(58) Field of Classification Search
CPC ................................................ H04N 1/00344
USPC ...................................................... 358/1.15
See application file for complete search history.

(56) References Cited

U.S. PATENT DOCUMENTS

| 7,886,033 | B2* | 2/2011 | Hopmann ........... H04L 12/2807 370/401 |
| 9,432,549 | B2 | 8/2016 | Komano et al. |
| 2002/0165984 | A1 | 11/2002 | Yuki |
| 2005/0086654 | A1 | 4/2005 | Sumi et al. |
| 2005/0128957 | A1 | 6/2005 | Yuki |
| 2006/0029082 | A1 | 2/2006 | Yuki |
| 2007/0061438 | A1 | 3/2007 | Yuki |
| 2007/0195781 | A1 | 8/2007 | Yuki |
| 2009/0222545 | A1 | 9/2009 | Yuki |
| 2011/0231542 | A1* | 9/2011 | Komano ............ H04N 1/00344 709/224 |
| 2012/0086980 | A1 | 4/2012 | Numata |
| 2013/0179556 | A1 | 7/2013 | Kurokawa et al. |
| 2013/0238776 | A1 | 9/2013 | Kinomoto |
| 2014/0143399 | A1 | 5/2014 | Kinomoto |

(Continued)

FOREIGN PATENT DOCUMENTS

| JP | 7-202822 | 8/1995 |
| JP | 9-233117 | 9/1997 |

(Continued)

*Primary Examiner* — Jacky X Zheng
(74) *Attorney, Agent, or Firm* — Oblon, McClelland, Maier & Neustadt, L.L.P.

(57) ABSTRACT

An information processing device includes circuitry to determine a connection state between the information processing device and an information device locally connected to the information processing device. The circuitry further transmits, to a device management apparatus connected to the information processing device through a network, information on the information device acquired from the information device when the connection state is a first state. The circuitry further deletes the information on the information device managed by the information processing device when the connection state is a second state.

11 Claims, 12 Drawing Sheets

(56) References Cited

U.S. PATENT DOCUMENTS

| | | | |
|---|---|---|---|
| 2014/0280512 | A1 | 9/2014 | Mori |
| 2015/0358172 | A1 | 12/2015 | Kinomoto |
| 2017/0272328 | A1 | 9/2017 | Kinomoto |

FOREIGN PATENT DOCUMENTS

| | | |
|---|---|---|
| JP | 11-098257 | 4/1999 |
| JP | 11-167472 | 6/1999 |
| JP | 11-194910 | 7/1999 |
| JP | 2000-148426 | 5/2000 |
| JP | 2000-163232 | 6/2000 |
| JP | 2000-172463 | 6/2000 |
| JP | 2000-194767 | 7/2000 |
| JP | 2000-305735 | 11/2000 |
| JP | 2001-022549 | 1/2001 |
| JP | 2001-071600 | 3/2001 |
| JP | 2001-306282 | 11/2001 |
| JP | 2002-032206 | 1/2002 |
| JP | 2002-189671 | 7/2002 |
| JP | 2002-229752 | 8/2002 |
| JP | 2002-236572 | 8/2002 |
| JP | 2002-312143 | 10/2002 |
| JP | 2003-150351 | 5/2003 |
| JP | 2004-038385 | 2/2004 |
| JP | 2004-185352 | 7/2004 |
| JP | 2004-252785 | 9/2004 |
| JP | 2004-252888 | 9/2004 |
| JP | 2004-318296 | 11/2004 |
| JP | 2005-115920 | 4/2005 |
| JP | 2005-204279 | 7/2005 |
| JP | 2005-235234 | 9/2005 |
| JP | 2006-024187 | 1/2006 |
| JP | 2007-080173 | 3/2007 |
| JP | 2007-109215 | 4/2007 |
| JP | 2007-221565 | 8/2007 |
| JP | 2008-027128 | 2/2008 |
| JP | 2008-072519 | 3/2008 |
| JP | 2008-221600 | 9/2008 |
| JP | 2008-310472 | 12/2008 |
| JP | 2009-071518 | 4/2009 |
| JP | 2009-238203 | 10/2009 |
| JP | 2010-072758 | 4/2010 |
| JP | 2010-218245 | 9/2010 |
| JP | 2011-170412 | 9/2011 |
| JP | 2011-224996 | 11/2011 |
| JP | 2011-227818 | 11/2011 |
| JP | 2012-138113 | 7/2012 |
| JP | 2013-143037 | 7/2013 |
| JP | 2013-186631 | 9/2013 |
| JP | 2013-232221 | 11/2013 |
| JP | 2014-078275 | 5/2014 |
| JP | 2014-103531 | 6/2014 |
| JP | 2014-170294 | 9/2014 |
| JP | 2014-170584 | 9/2014 |
| JP | 2015-230642 | 12/2015 |
| JP | 2017-167824 | 9/2017 |
| JP | 2017-194751 | 10/2017 |

\* cited by examiner ured as each one of a device
INFORMATION PROCESSING DEVICE AND DEVICE MANAGEMENT APPARATUS

CROSS-REFERENCE TO RELATED APPLICATION

This patent application is based on and claims priority pursuant to 35 U.S.C. § 119(a) to Japanese Patent Application No. 2018-051087, filed on Mar. 19, 2018 in the Japan Patent Office, the entire disclosure of which is hereby incorporated by reference herein.

BACKGROUND

Technical Field

The present disclosure relates to an information processing device and a device management apparatus. More specifically, the present disclosure relates to the information processing device and the device management apparatus that manage information on information devices.

Related Art

Conventionally, there is a known device management system, which is provided with a network interface card and which manages peripheral devices (hereinafter referred to as network devices) having a Simple Network Management Protocol (SNMP) agent function. In recent years, there is a demand to add peripheral devices that are locally connected to an information processing device, such as a personal computer, via a Universal Serial Bus (USB), to devices to be managed as with the network devices described above. Hereinafter, the devices locally connected is also referred to as local information devices. In addition, there is a known technique in which the information processing device acquires device information from the local information device using, between the information processing device and the local information device, a combination of a specific protocol, such as a USB communication, and a printing language, such as a Printer Job Language (PJL).

SUMMARY

An exemplary embodiment of the present disclosure includes an information processing device includes circuitry to determine a connection state between the information processing device and an information device locally connected to the information processing device. The circuitry further transmits, to a device management apparatus connected to the information processing device through a network, information on the information device acquired from the information device when the connection state is a first state. The circuitry further deletes the information on the information device managed by the information processing device when the connection state is a second state.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
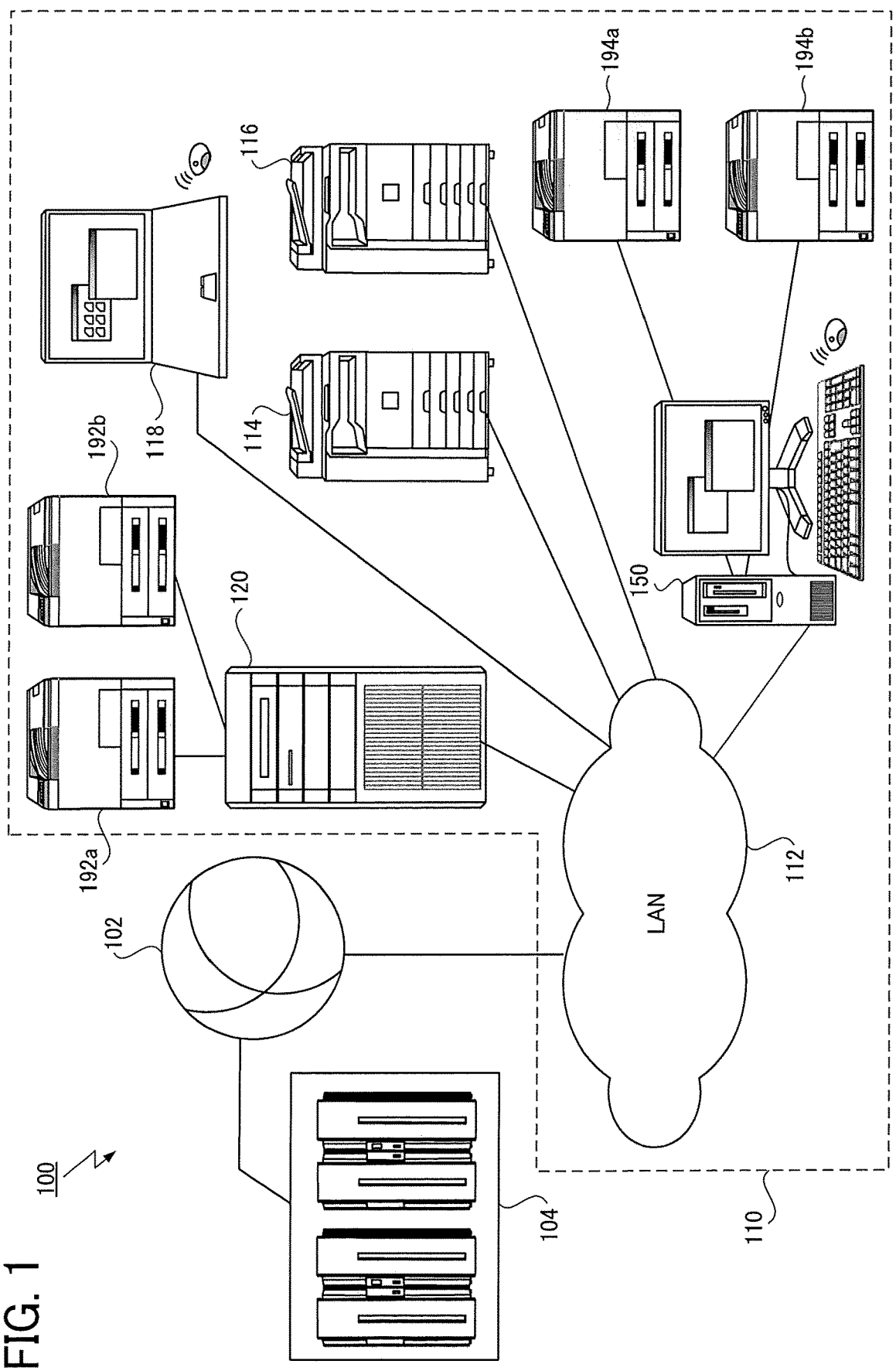
FIG. 1 is an illustration of an overall configuration of a device management system according to an embodiment of the disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Embodiments according to the present disclosure are described below. However, the present disclosure is not intended to be limited to the embodiments described herein.

Figure 7:
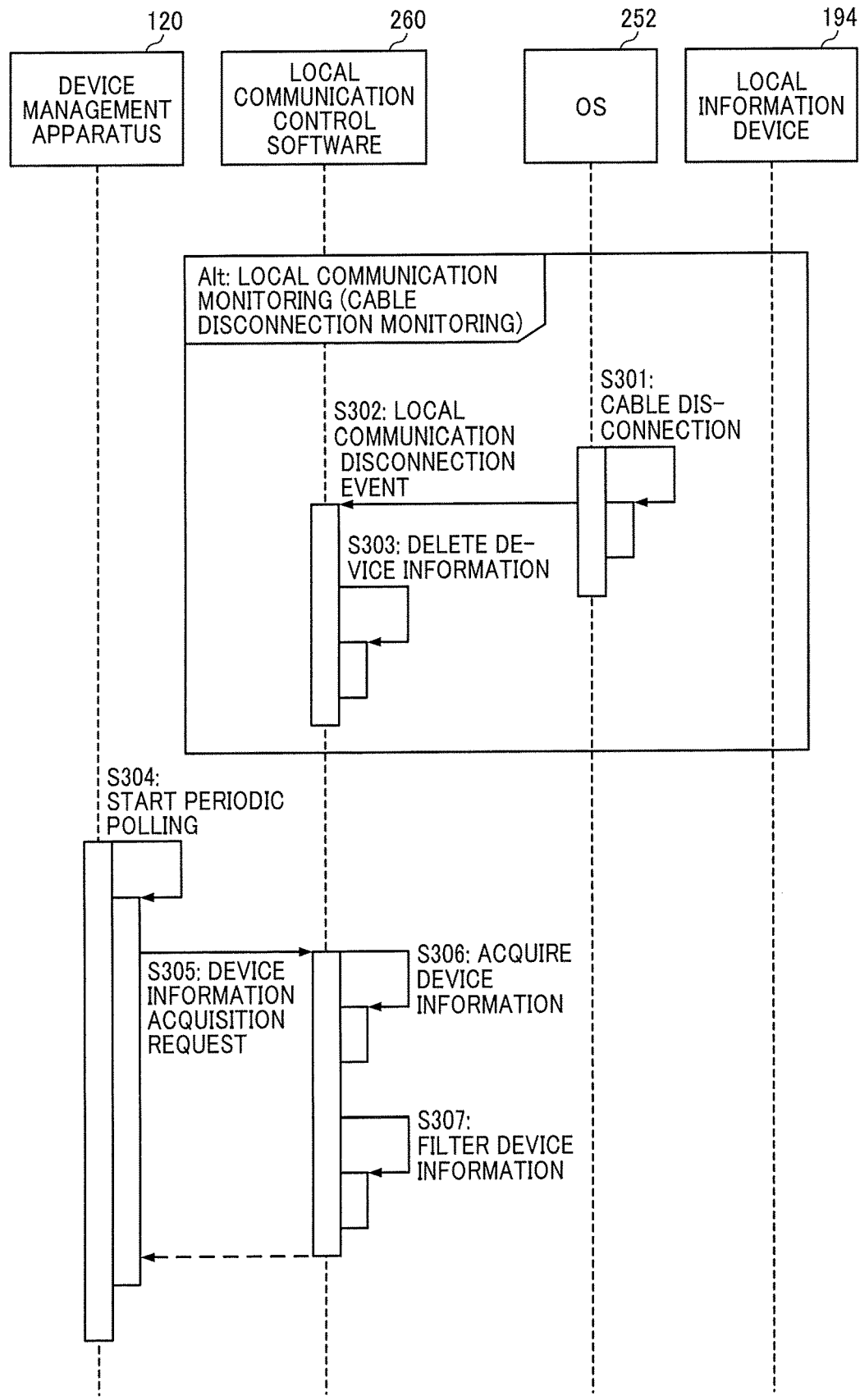
FIG. 7 is a sequence diagram illustrating a periodic polling process in which a connection state between an information processing device and a local information device is determined based on a local communication disconnection event in a device management system in according to an embodiment of the disclosure.
Figure 8:
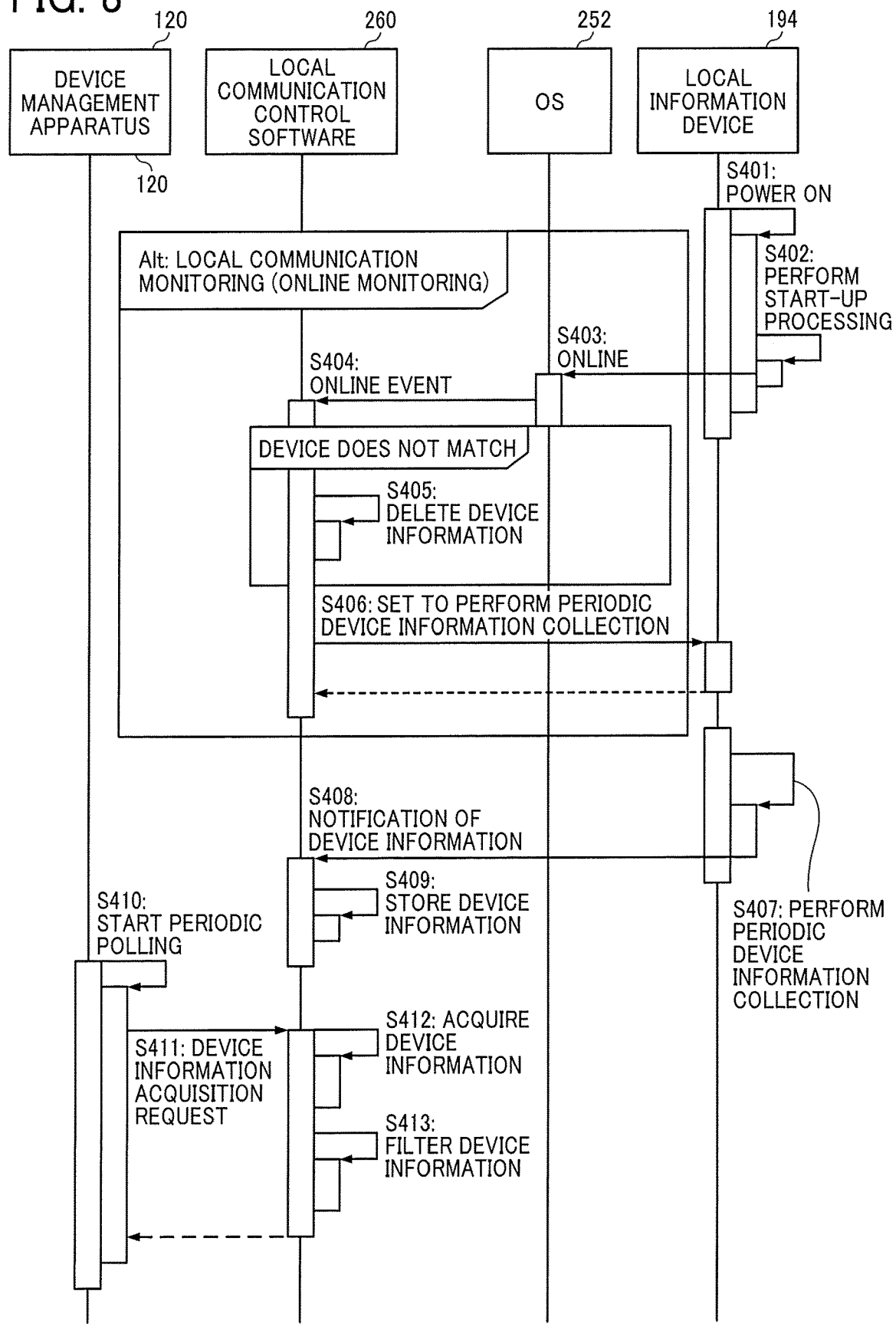
FIG. 8 is a sequence diagram illustrating a periodic polling process in which a connection state between an information processing device and a local information device is determined based on an offline event in a device management system according to an embodiment of the disclosure.
Figure 9A:
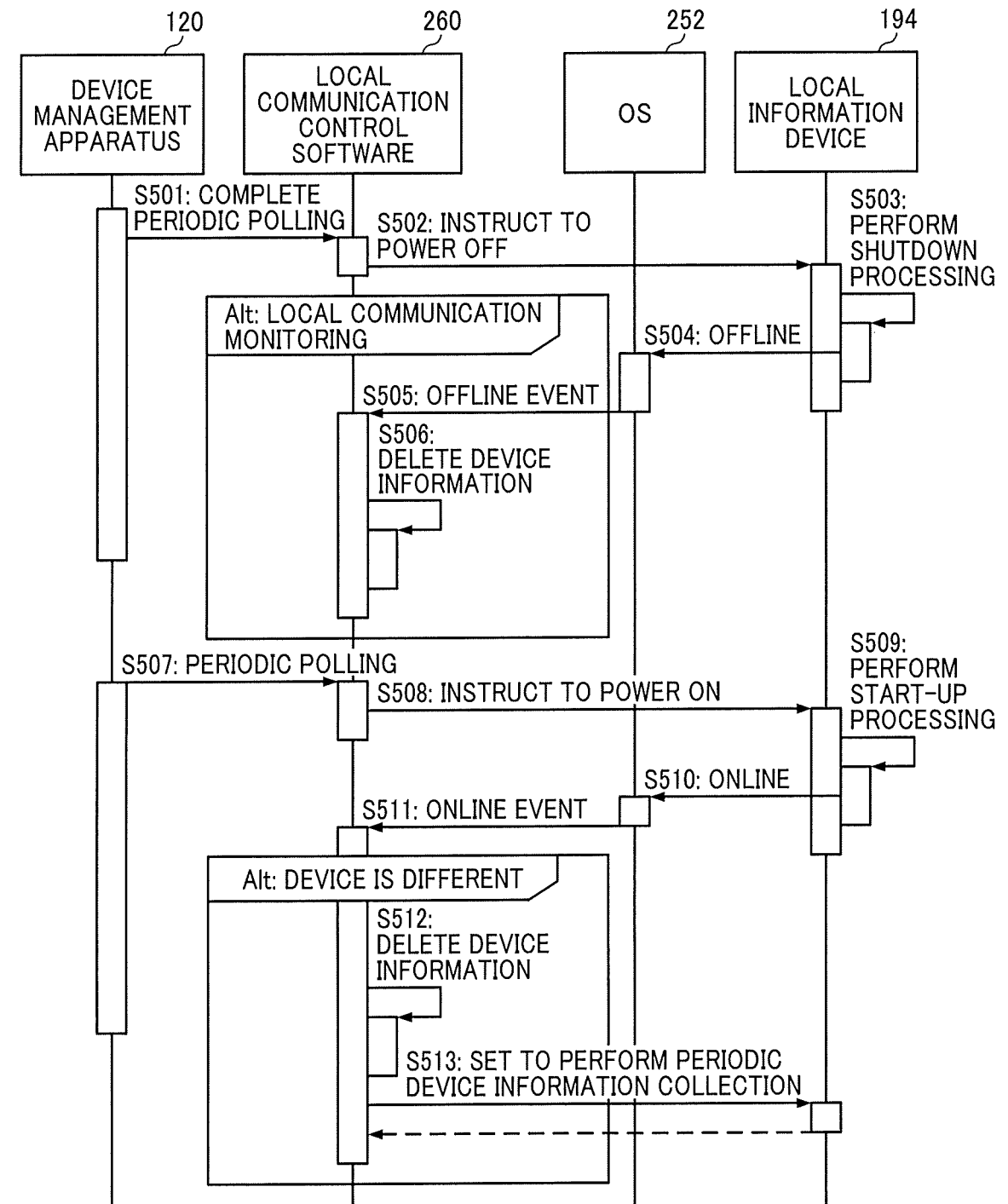
FIG. 9A and FIG. 9B are a sequence diagram illustrating a periodic polling process performed based on an instruction to turn on or off a power supply of a local information device, in a device management system according to an embodiment of the disclosure.
Figure 9B:
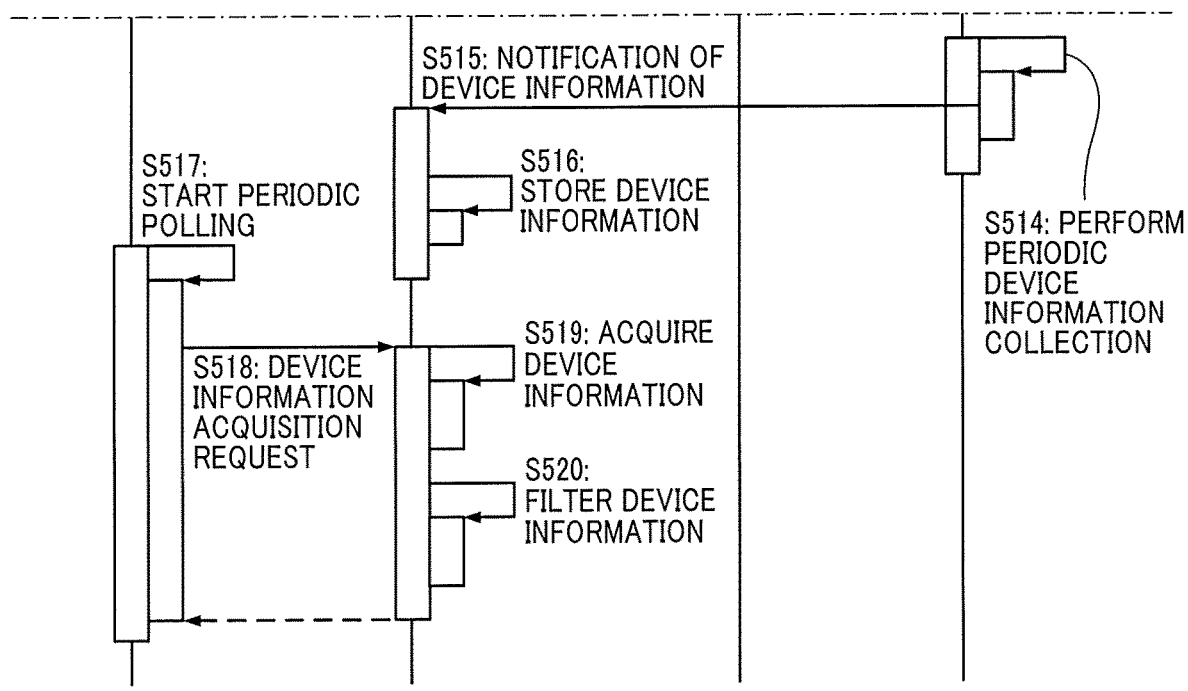

A description is now given of a device management system 100 for managing one or more devices to be managed, according to an embodiment of the disclosure, with reference to FIG. 1 to FIG. 9 (FIG. 9A and FIG. 9B).

A description is now given of an overall configuration of the device management system 100 according to the present embodiment, with reference to FIG. 1. FIG. 1 is an illustration of the overall configuration of the device management system 100 that includes a device management apparatus 120 and an information processing device 150, according to the present embodiment. The device management system 100 illustrated in FIG. 1 includes a data center 104 connected to the Internet 102, a Local Area Network (LAN) 112 connected to the Internet 102 via a router or the like, and a plurality of devices on the LAN 112.

The data center 104 manages firmware and software such as an application. The data center 104 includes a group of servers that performs license authentication, such as activation or deactivation of the software. The software to be managed includes software such as device management software and a printer driver. The firmware includes firmware such as an application of a device, for example. An example of the application includes a Software Development Kit (SDK) application developed by using a software development kit, for controlling a device.

The LAN 112 is a network built in an organization 110, such as a government agency, an educational institution, or a company, and a plurality of nodes are connected to the LAN 112. In the example illustrated in FIG. 1, one or more first information devices 114 and 116, an administrator terminal 118, the device management apparatus 120, and one or more information processing devices 150 are set to the nodes connected to the LAN 112.

These devices 114, 116, 118, 120, and 150 communicate each other through the LAN 112 by a packet communication based on Transmission Control Protocol (TCP)/Internet Protocol (IP). The LAN 112 may be, for example, a wired or a wireless local area network in compliance with a standard such as the 1000Base-TX Ethernet (registered trademark) or the Institute of Electrical and Electronics Engineers (IEEE) 802.11. Some or all of these devices 114, 116, 118, 120, and 150 are connected to the data center 104 through the Internet 102.

The device management apparatus 120 is a computer on which device management software for managing one or more information devices to be managed is installed and has various functions for managing the information devices to be managed.

Examples of the first information devices 114 and 116 connected to the LAN 112 illustrated in FIG. 1 include a Multifunction Peripheral/Printer/Product (MFP), a printer, a facsimile communication device, a projector, and an interactive electronic whiteboard, each of which includes a network interface card. The first information devices 114 and 116 are devices to be managed by the device management apparatus 120, and each of the information devices 114 and 116 transmits information on the own device in response to a request received from the device management apparatus 120. Hereinafter, the information on a device is also referred to as device information.

The administrator terminal 118 is a terminal device for remotely accessing a user interface of the device management software provided by the device management apparatus 120 and is used, by a system administrator or the like, for operating the device management system 100. The access to the user interface of the device management software is not limited to an external terminal device such as the administrator terminal 118 and may be performed via a display device or an input device of the device management apparatus 120.

The information processing device 150 is a computer device such as a personal computer, which is generally used by a user. The information processing device 150 is locally connected to one or more second information devices 194a and 194b via a Universal Serial Bus (USB) cable or the like. Hereinafter, the one or more second information devices 194a and 194b are also collectively or individually referred to as (a) second information device(s) 194, when being unnecessary to be distinguished from each other. The second information device 194 is a device that is connected to the information processing device 150 and has a USB port, for example. Examples of the second information device 194 include an MFP, a printer, a facsimile communication device, a projector, and an interactive electronic whiteboard, however, the embodiments are not intended to be limited to these.

In addition, in the description of the embodiment, a wired USB connection is used as an example of a local connection, and the embodiment is applicable to a local connection of wired USB connection. However, the embodiments are not intended to be limited to the wired USB connection. In other one or more embodiments, any connection using, for example, a wireless USB, Bluetooth (registered trademark), or the like may be used as a local connection between a computer and a device.

In the example of FIG. 1, one or more third information devices 192a and 192b are also locally connected to the device management apparatus 120. Hereinafter, the one or more third information devices 192a and 192b are also collectively or individually referred to as (a) third information device(s) 192, when being unnecessary to be distinguished from each other. In the present embodiment, the devices to be managed by the device management apparatus 120 include, in addition to the first information devices 114 and 116, which are connected using a network connection, the third information devices 192a and 192b, which are locally connected to the device management apparatus 120, and the second information devices 194a and 194b, which are locally connected to the information processing device 150. Hereinafter, the first information devices 114 and 116 are also referred to as network information devices 114 and 116. In addition, hereinafter, the second information device 194 and the third information device 192 are also referred to as a local information device 194 and a local information device 192, respectively.

Figure 10:
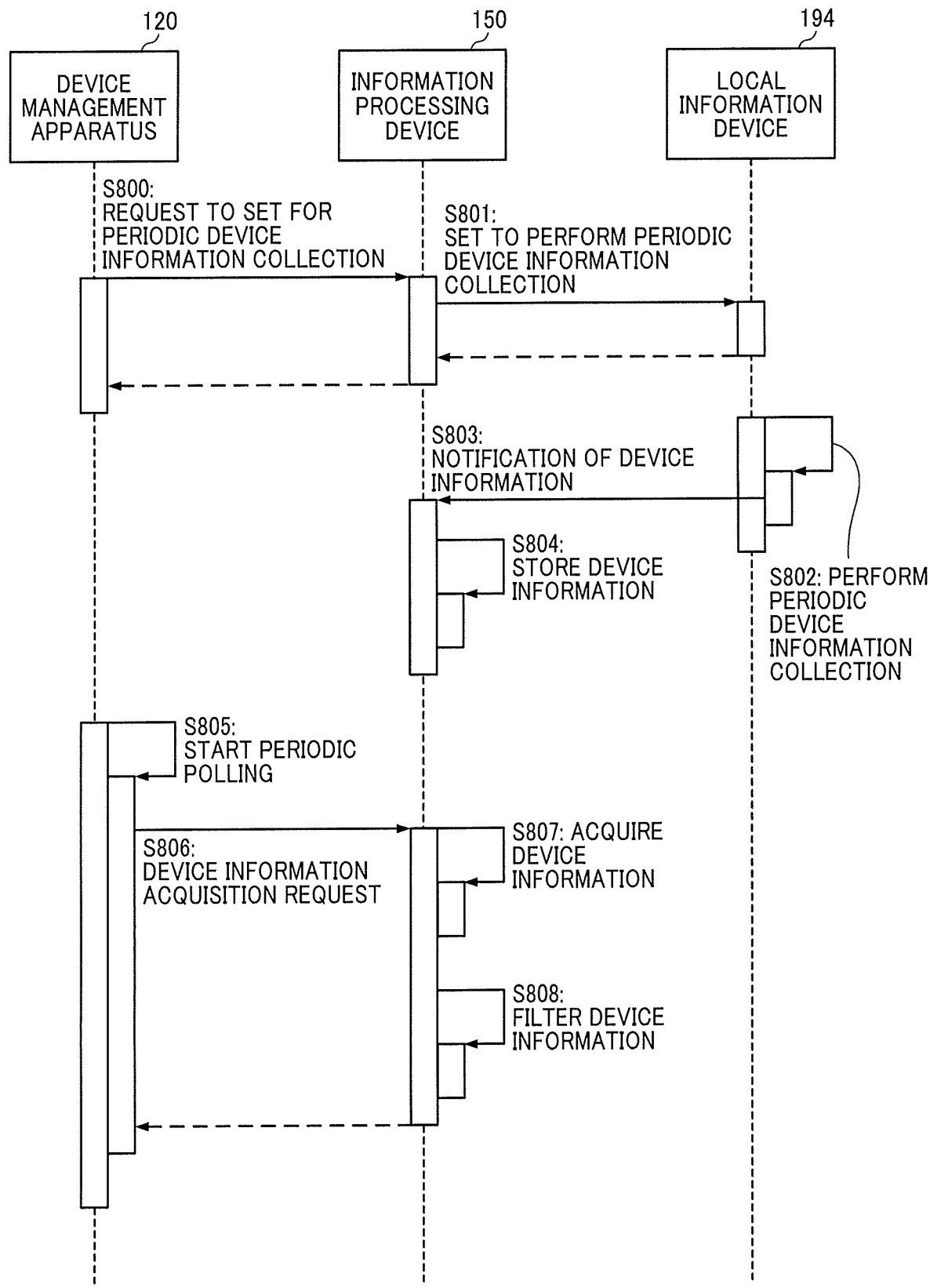
FIG. 10 is a sequence diagram illustrating a typical process of acquiring device information from an information device locally connected to an information processing device, in a device management system.

Before a detailed description of the device management system 100 according to the present embodiment is given, a description of a typical device management method for managing information devices that are locally connected is given, with reference to FIG. 10.

FIG. 10 is a sequence diagram illustrating a typical process of acquiring information on the local information device 194 locally connected to the information processing device 150 in the device management system 100.

In S800, the device management apparatus 120 requests the information processing device 150 to set for periodic device information collection, through a network such as the LAN 112. The periodic device information collection indicates collecting device information periodically. In S800, the information processing device 150 sets the local information device 194 to perform the periodic device information collection.

In S802, upon detecting that a time for the periodic device information collection has come, the local information device 194 collects information on the own device, namely the local information device 194 collects information on the local information device 194, which is device information. In S803, the local information device 194 transmits the device information to the information processing device 150 to which the own device (local information device 194) is locally connected. In S804, the information processing device 150 stores the device information received, from the local information device 194 through the local connection, in an external storage device, for example.

In S805, the device management apparatus 120 detects that a scheduled time has come and starts periodic polling. In S806, the device management apparatus 120 transmits a request for device information to the information processing device 150 through a network such as the LAN 112. Hereinafter, the request for device information is also referred to as a device information acquisition request. At this time, in addition to the information processing device 150, a device information acquisition request is transmitted to the network information devices 114 and 116, however a description thereof is omitted here.

In S807, in response to the device information acquisition request, the information processing device 150 acquires information on corresponding local information devices from the external storage device. In S808, the information processing device 150 filters all the device information to extract only necessary device information and transmits the extracted device information after the filtering to the device management apparatus 120 through a network such as the LAN 112.

With the process described above, the device management apparatus 120 can acquire the information on the local information device 194 locally connected to the information processing device 150 connected to the own device (device management apparatus 120) through the network. However, in a case in which the periodic device information collection is not performed due to a predetermined reason, the device information stored in the external storage device of the information processing device 150 is not to be updated, and this may cause the following problems. Even when the device management apparatus 120 performs the periodic polling, the information on the local information device 194 that is not updated is transmitted, which means old information is transmitted, and, accordingly, the management or maintenance of the information devices may be failed to be performed appropriately.

Examples of the predetermined reason may include a case in which a power supply of the local information device 194 is turned off, a case in which the local communication, such as a USB communication, is inactive, a case in which the USB cable is disconnected, a case in which the USB cable is plugged into a wrong USB terminal or a different USB terminal, and a case in which the local information device 194 has been replaced.

For example, in a company, it is general for staff members to turn off a power supply of an information device after finishing his or her job, and the USB communication becomes inactive after turning off the power supply. In addition, when a user trips over the USB cable, which is a wired cable, the USB cable may be physically disconnected from the USB terminal, causing the USB communication to be inactive. In addition, when the USB cable is plugged into a wrong USB terminal or a different USB terminal, a USB port name sometimes changes, and in such a case, the USB communication with the original USB port becomes inactive. In addition, when the local information device 194 is replaced with another one due to breakdown, device information also changes. In such a case, the device information stored in the external storage device of the information processing device 150 is different from information on the local information device 194 that is newly replaced and the information on the local information device 194 that is newly replaced may be processed as information on a new information device.

Figure 11:
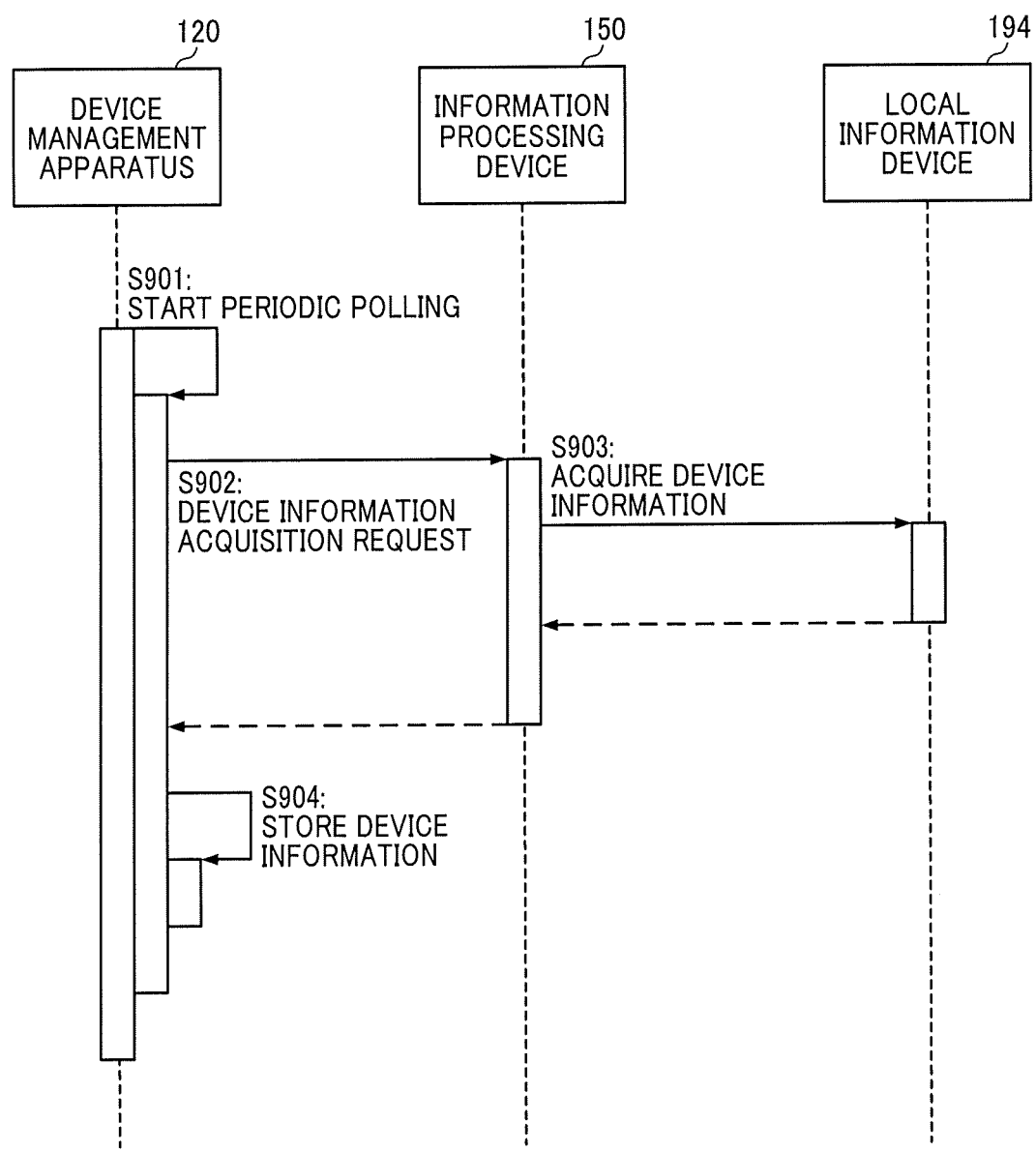
FIG. 11 is a sequence diagram illustrating a typical process of acquiring device information from an information device locally connected to an information processing device in a device management system in a manner substantially same as or similar to an information device connected through a network.

In addition, in the device management system 100, by performing another process as illustrated in FIG. 11, the device management apparatus 120 can acquire device information from the local information device 194 locally connected to the information processing device 150, as with the network information devices 114 and 116 connected to the device management apparatus 120 through a network. FIG. 11 is a sequence diagram illustrating a typical process of acquiring device information from the local information device locally connected to the information processing device 150 in the device management system 100 in a manner substantially same as or similar to an information device connected through a network.

In the process illustrated in FIG. 11, the device management apparatus 120 starts periodic polling in S901. In S902, the device management apparatus 120 transmits a device information acquisition request to the information processing device 150. In S903, in response to the device information acquisition request, the information processing device 150 acquires device information from the local information device 194 locally connected to the information processing device 150 and transmits the acquired device information to the device management apparatus 120. In S904, the device management apparatus 120 stores the received device information in an external storage device, for example.

However, the USB communication is used not only for acquiring the device information but also for processing including printing processing using the local information device 194. Accordingly, a communication speed of the USB communication is slow, and collecting the device information takes time. If the device management apparatus 120 often acquires the device information as illustrated in FIG. 11, namely, for example, if the USB communication is used more often for acquiring the device information than for the printing processing, performance of the printing processing using the local information device 194 can be degraded. For this reason, in general, as illustrated in FIG. 10, when the local information device 194 does not perform printing processing, the local information device 194 collects the device information and transmits the collected device information to the information processing device 150 and the external storage device of the information processing device 150 temporarily stores the received device information and then transmits the device information to the device management apparatus 120 at a timing of the periodic polling.

A detailed description is now given of the device management system 100 according to the present embodiment, which can overcome the problem described above, with reference to FIG. 2 to FIG. 9 (FIG. 9A and FIG. 9B).

Figure 2:
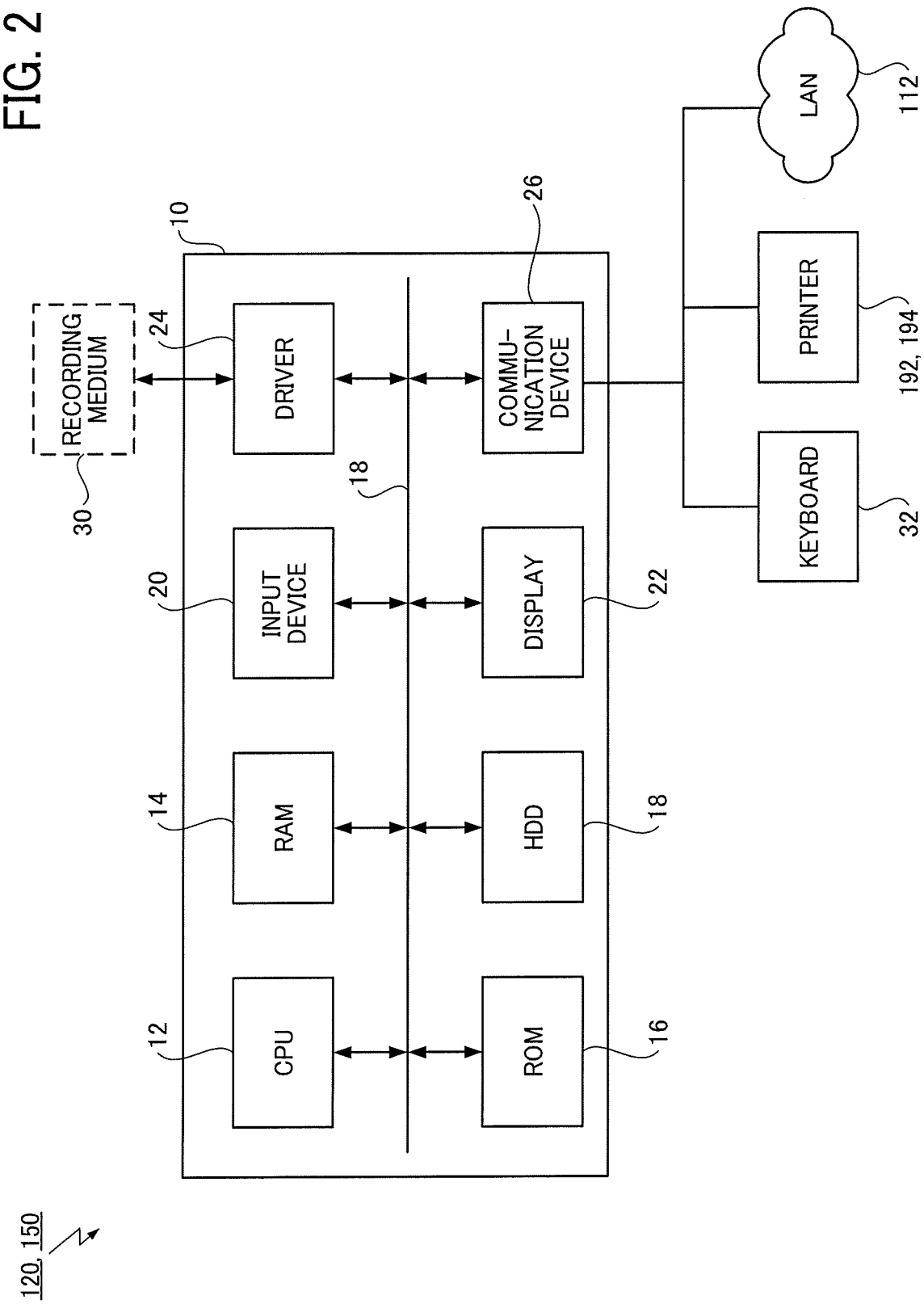
FIG. 2 is a block diagram illustrating a hardware configuration of a computer used as each one of a device management apparatus and an information processing device according to an embodiment of the disclosure.

A description is now given of a hardware configuration of a computer 10 that is used as each one of the device management apparatus 120 and the information processing device 150 according to the present embodiment, with reference to FIG. 2. FIG. 2 is a block diagram illustrating the hardware configuration of the computer 10. The computer 10 is typically a general-purpose computer, such as a personal computer, server computer, or the like.

The computer 10 illustrated in FIG. 2 includes a single-core or multi-core Central Processing Unit (CPU) 12, a Random-Access Memory (RAM) 14, a Read Only Memory (ROM) 16, a Hard Disk Drive (HDD) 18, a driver 24, and a communication device 26. The computer 10 may include an input device 20 and a display 22 if necessary.

The CPU 12 controls the overall operation, such as performing internal operation, of the computer 10. The RAM 14 provides a working area for the CPU 12. The ROM 16 stores a control program such as Basic Input/Output System (BIOS), etc. The HDD 18 stores an Operating System (OS) for controlling the computer 10, a program for implementing functional units, which are described later, various types of system information, and various types of configuration information. The HDD 18 may be connected via a Serial AT Attachment (SATA) interface or a USB cable, for example. A recording medium 30 is detachably inserted into the driver 24, and the driver 24 reads from or writes to the inserted recording medium 30.

The input device 20 is an input device such as a mouse or a touch screen panel, for example. The display 22 is a display device such as a liquid crystal display or an organic electroluminescence (EL) display, for example. The input device 20 and the display 22 provide a user interface for receiving various types of instructions input according to a user operation. The communication device 26 is an interface device such as a Network Interface Card (NIC) or USB, for example. In the embodiment illustrated in FIG. 2, the communication device 26 connects the computer 10 to a keyboard 32, the information device 192 or 194, the LAN 112.

The above described hardware components are connected to each other through a built-in bus that is a common path for exchanging data by each circuit, or via an appropriate interface. The computer 10 according to the present embodiment reads a program from the ROM 16 or the HDD 18 and develops the read program onto a work space provided by the RAM 14, so that each of the functions described later or each of the processes described later is implemented, as the device management apparatus 120 or the information processing device 150 under the control of the CPU 12.

Figure 3:
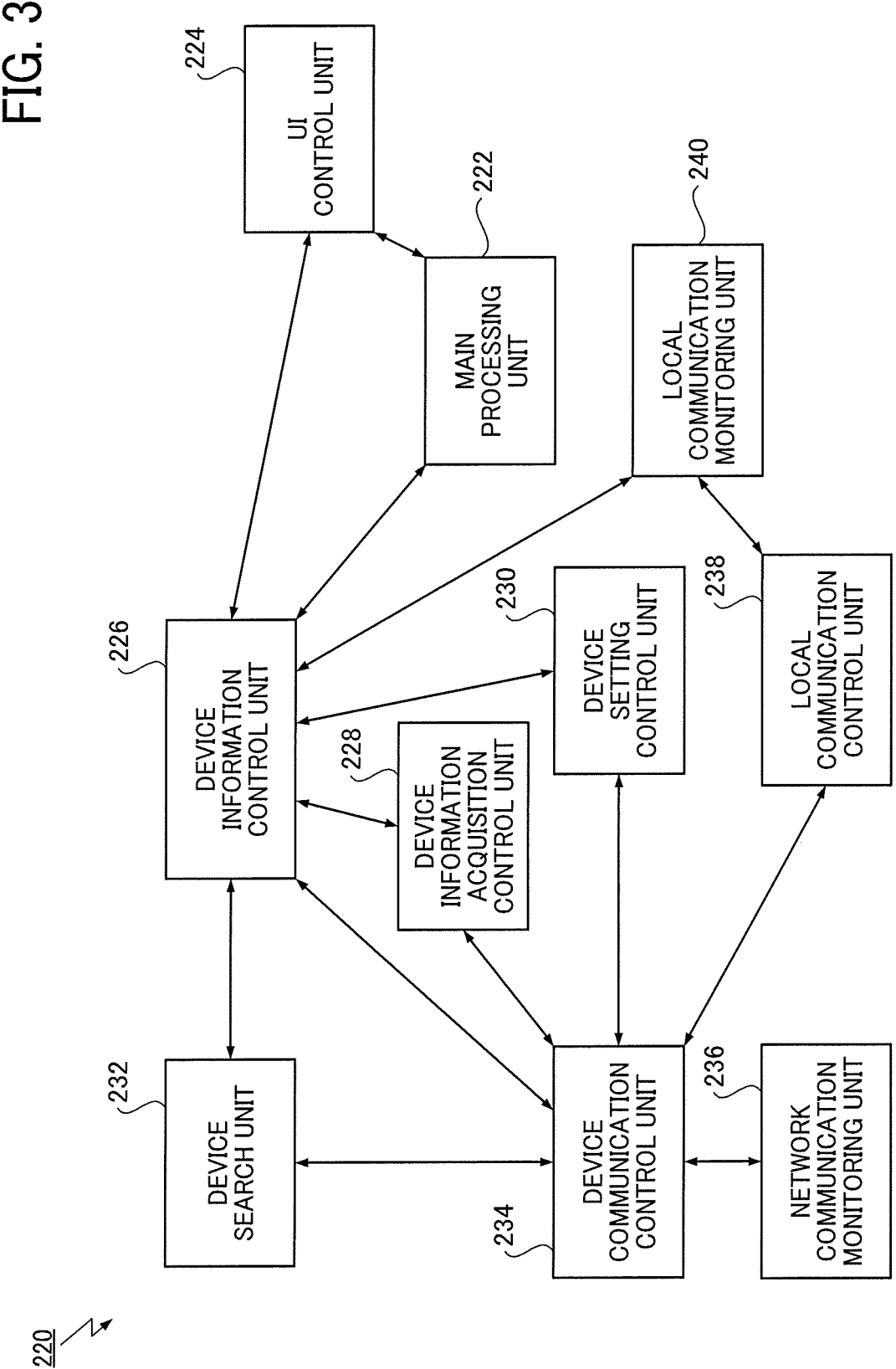
FIG. 3 is a block diagram illustrating functions implemented on a device management apparatus and related to management of device information, according to an embodiment of the disclosure.

A detailed description is now given of functions, which are for managing a local information device, of the device management apparatus 120 according to the present embodiment, with reference to FIG. 3. FIG. 3 is a block diagram illustrating functions, which are implemented on the device management apparatus 120 and related to the management of the information on the local information device 194, according to the present embodiment.

As illustrated in FIG. 3, functional blocks (a functional configuration) 220 on the device management apparatus 120 include a main processing unit 222, a user interface (UI) control unit 224, a device information control unit 226, a device information acquisition control unit 228, a device setting control unit 230, a device search unit 232, a device communication control unit 234, and a network communication monitoring unit 236.

The main processing unit 222 controls various tasks (search, polling, setting, etc.) for device management. The UI control unit 224 controls generation and display of a device management screen to be displayed on a web browser and controls user operation.

The device information control unit 226 writes device information to an external or internal storage device (RAM 14, HDD 18, etc.), acquires device information from the storage device, and deletes device information stored in the storage device. The device information control unit 226 also controls searching a device by the device search unit 232, controls acquiring device information by the device information acquisition control unit 228, and controls settings for a device by the device setting control unit 230.

The device information acquisition control unit 228 acquires device information using, for example, a Simple Network Management Protocol (SNMP) communication using one of a standard Management Information Base (MIB) and a private MIB, a simple object access protocol (SOAP) communication using a web service, etc. The device setting control unit 230 sets a device, using, for example, a SNMP communication using MIB or a SOAP communication using a web service, etc. The device search unit 232 searches for a device using, for example, broadcasting or a 1:1 communication, which is designated an IP address range, etc. The device search unit 232 also selects a protocol for performing a search for a device using, for example, a SNMP communication using a standard MIB, USB port search of a USB printer, etc.

The device communication control unit 234 controls access to a device using, for example a SNMP communication using an IP address, a SOAP communication, and a USB communication using a USB port. The network communication monitoring unit 236 controls communication between the own device (device management apparatus 120) and a local information device (timeout monitoring, protocol transmission and reception management, etc.).

The functional blocks 220 of the device management apparatus 120 according to the present embodiment further include a local communication control unit 238 and a local communication monitoring unit 240.

The local communication control unit 238 controls a USB communication, such as transmission and reception management using a USB port. The local communication monitoring unit 240 can receive an offline notification from the local information device 192, receive an online notification from the local information device 192, receive a USB communication disconnection notification from the OS, and detect the non-USB-communication.

In the present embodiment, the local communication monitoring unit 240 serves as a determination unit that determines a connection state between the device management apparatus 120 and the local information device 192. A storage device such as the HDD 18 or the RAM 14 included in the device management apparatus 120 stores the device information acquired from the local information device 192, when the connection state between the device management apparatus 120 and the local information device 192 indicates that the communication is active (first state). In the present embodiment, the storage device serves as a storage unit. When the connection state between the device management apparatus 120 and the local information device 192 indicates that communication is inactive (second state), the device information control unit 226 deletes information on the local information device 192, which is managed in the storage device by the device management apparatus 120. The device information control unit 226 serves as a device information deletion unit.

The state in which the communication is active (first state) means that the device management apparatus 120 and the local information device 192 can communicate with each other by a wired or wireless communication, and the local information device 192 is powered on and activated. The state in which the communication is inactive (second state) means one or both of a state in which the wired or wireless communication between the device management apparatus 120 and the local information device 192 is disconnected and a state in which the local information device 192 is powered off and deactivated.

The local communication monitoring unit 240 can detects a change in the communication state, in which the communication becomes inactive (second state), based on at least one of an offline event notified in response to shutdown of the local information device 192, a reply from the local information device 192 in response to a try to establish a wired or wireless communication with the local information device 192, and a communication disconnection event notified in response to disconnection of the wired or wireless communication from the local information device 192.

Figure 4:
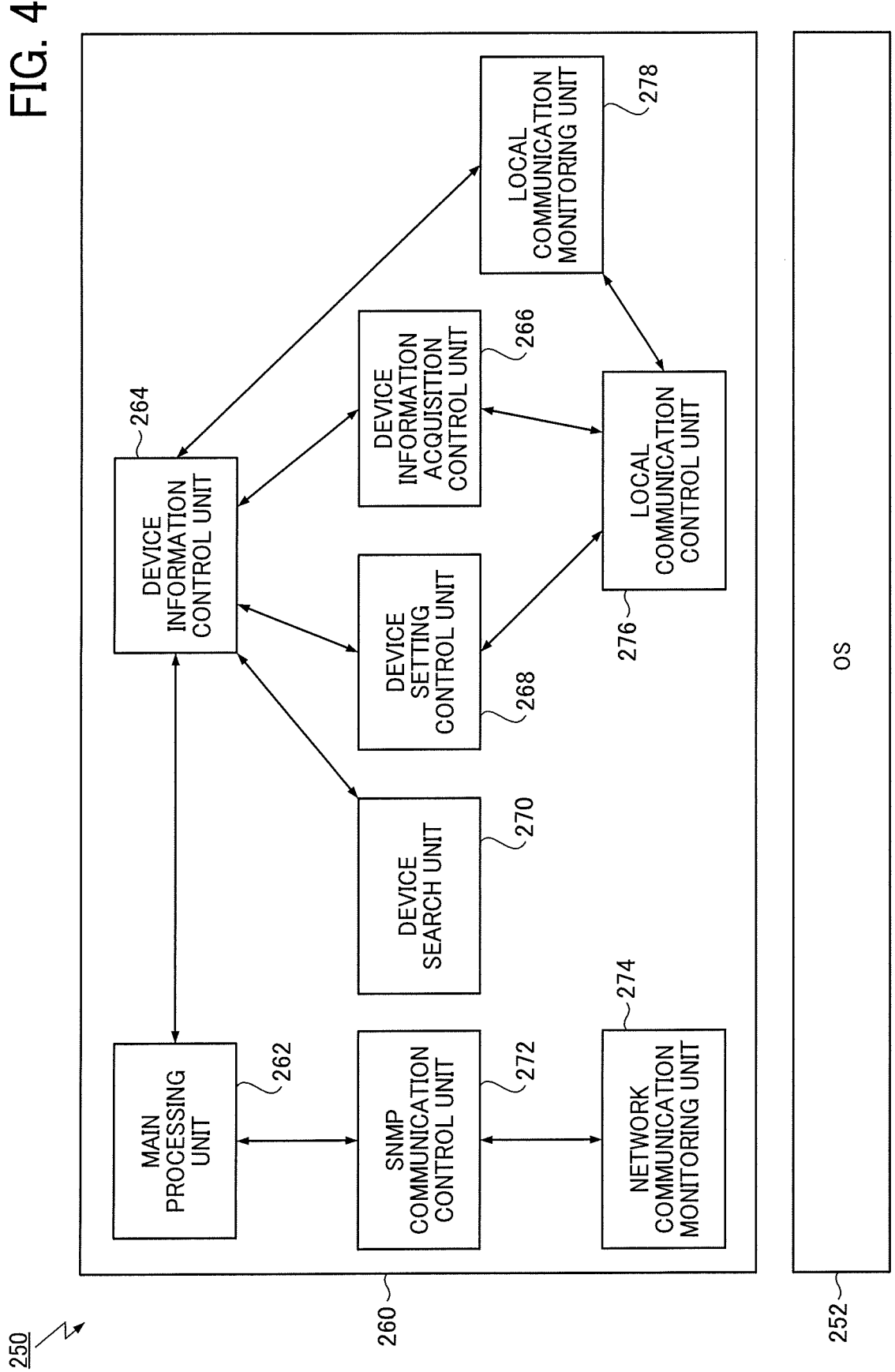
FIG. 4 is a block diagram illustrating functions implemented on an information processing device and related to management of device information, according to an embodiment of the disclosure.

A detailed description is now given of functions, which are for managing a local information device, of the information processing device 150 according to the present embodiment, with reference to FIG. 4. FIG. 4 is a block diagram illustrating functions, which are implemented on the information processing device 150 and related to the management of the information on the local information device, according to the present embodiment.

As illustrated in FIG. 4, functional blocks (a functional configuration) 250 on the information processing device 150 include an operating system (OS) 252 and local connection control software 260 installed on the OS 252.

The local connection control software 260 is an application that monitors the local information device 194, which is in a local connection state or connected via a USB. In the embodiment, the local connection control software 260 is remotely installed on the information processing device 150 from the device management apparatus 120 or installed on the information processing device 150 using an install medium, in advance, for example. An installation method of the local connection control software 260 is not particularly limited.

The local connection control software 260 includes a main processing unit 262, a device information control unit 264, a device information acquisition control unit 266, a device setting control unit 268, a device search unit 270, an SNMP communication control unit 272, and a network communication monitoring unit 274.

The main processing unit 262 controls processing in relation to the local information device 194, which is in relation to the device management apparatus 120. The device information control unit 264 writes device information to an external or internal storage device (RAM 14, HDD 18, etc.), acquires device information from the storage device, and deletes device information stored in the storage device. The device information control unit 264 also controls searching a device by the device search unit 270, controls acquiring device information by the device information acquisition control unit 266, and controls settings for a device by the device setting control unit 268.

The device information acquisition control unit 266 acquires device information by a local communication protocol such as a USB communication protocol and periodically receives the device information from the local information device 194. The device information acquisition control unit 266 serves as an acquisition unit that acquires the device information from the local information device 194.

The device setting control unit 268 sets the local information device 194 to transmit the device information periodically to the information processing device 150. The device setting control unit 268 serves as a setting unit that sets for device information collection. The device search unit 270 searches a port of a USB printer possessed by the OS.

The SNMP communication control unit 272 controls SNMP communication with the device management apparatus 120. The network communication monitoring unit 274 controls communication between the own device (information processing device 150) and the device management apparatus 120 (timeout monitoring, protocol transmission and reception management, etc.).

The functional blocks 250 of the information processing device 150 according to the present embodiment further include a local communication control unit 276 and a local communication monitoring unit 278.

The local communication control unit 276 controls a USB communication, such as management of transmission and reception using a USB port. The local communication monitoring unit 278 receives an offline notification from the local information device 194, receives an online notification from the local information device 194, receives a USB communication disconnection notification from the OS 252, and detects the non-USB-communication.

In the present embodiment, the local communication control unit 276 serves as a determination unit that determines a connection state between the information processing device 150 and the local information device 194. In the present embodiment, the network communication monitoring unit 274 serves a device information transmission unit that transmits the device information acquired from the local information device 194 to the device management apparatus 120, when the connection state between the information processing device 150 and the local information device 194 indicates that communication is active (first state). When the connection state between the information processing device 150 and the local information device 194 indicates that communication is inactive (second state), the device information control unit 264 deletes information on the local information device 194, which is managed in the storage device by the information processing device 150. In the present embodiment, the device information control unit 264 serves as a device information deletion unit. The device information acquired from the local information device 194 may be stored in the storage device included in the information processing device 150 or may be stored in an external storage device connected to the information processing device 150.

The state in which the communication is active (first state) means that the information processing device 150 and the local information device 194 can communicate with each other by a wired or wireless communication, and the local information device 194 is powered on and activated. The state in which the communication is inactive means one or both of a state in which the wired or wireless communication between the information processing device 150 and the local information device 194 is disconnected and a state in which the local information device 194 is powered off and deactivated.

The local communication monitoring unit 278 can detects change in the communication state, in which the communication becomes inactive (second state), based on at least one of an offline event notified in response to shutdown of the local information device 194, a reply from the local information device 194 in response to a try to establish a wired or wireless communication with the local information device 194, and a communication disconnection event notified in response to disconnection of the wired or wireless communication from the local information device 194.

The offline event is an event generated by the OS 252 based on a notification transmitted to the information processing device 150 to notify disconnection from the USB communication before the local information device 194 shuts down. In addition, the OS such as Windows (registered trademark) determines the USB communication disconnection when a signal unique to the USB is not detected within a set time by a USB signal detecting means. In such a case, the USB communication disconnection event is notified to an application running on the OS.

As examples of a method of acquiring the device information from the local information device 194, the following methods can be used. The OS such as Windows (registered trademark) uses a printer job control language when transmitting or receiving data to or from the local information device 194, such as a printer or an MFP, via a USB. As the printer job control language, PJL is known, but the PJL has its own extension to the manufacturer specification conforming to the PJL language, and it is possible to "program a function of insert another sheet (slip sheet function)" between a plurality documents to be printed out. By adding a command to acquire device information to this function extension, it is possible to acquire information on the local information device 194, such as a printer or an MFP.

A detailed description is now given of a process of deleting information on the local information device 194 that is disconnected from communication to prevent transmission of erroneous information to the device management apparatus 120, according to one or more embodiments, with reference to FIG. 5 to FIG. 9 (FIG. 9A and FIG. 9B).

Figure 5:
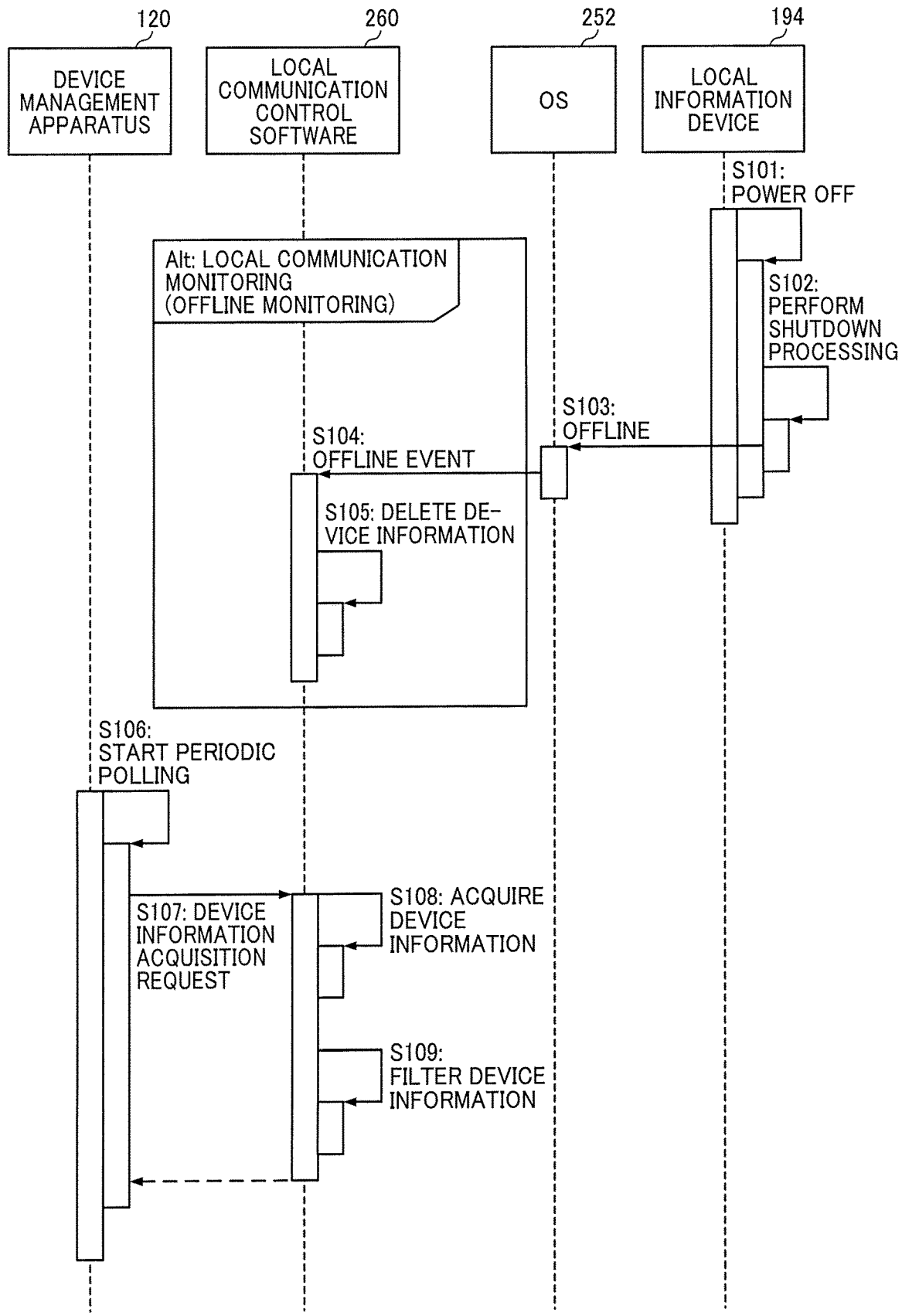
FIG. 5 is a sequence diagram illustrating a periodic polling process in which a connection state between an information processing device and a local information device is determined based on an offline event, in a device management system according to an embodiment of the disclosure.

FIG. 5 is a sequence diagram illustrating a periodic polling process in which a connection state between the information processing device 150 and the local information device 194 is determined based on an offline event, in the device management system 100 according to an exemplary embodiment.

The process illustrated in FIG. 5 is started when a power supply of the local information device 194 is turned off in S101. In S102, the local information device 194 performs shutdown processing. In S103, the local information device 194 transmits an offline notification to the information processing device 150. As an example of the offline notification, a PJL command, such as "@ PJL ECHO POWER-OFF <CR><LF>", is used and transmitted to the information processing device 150.

In S104, in the information processing device 150, the OS 252 notifies the local connection control software 260 of an offline event, and the local communication monitoring unit 278 detects the offline event.

In S105, the local connection control software 260 of the information processing device 150 issues an instruction to cause the device information control unit 264 to delete, from a storage device, information on the local information device 194 related to the offline event, resulting in deletion of the device information. Because of this, the storage device stores information indicating that there is no information on the local information device 194, accordingly.

A description is now given of the instruction to delete the device information. The instruction to delete the device information is a delete command with information identifying an information device as a search key. The OS 252 stores, in a management area of the OS 252 (registry in a case of Windows (registered trademark)), basic information on a local information device connected to a USB. The basic information includes for example, a USB port name, a manufacturer name, a serial number, and a model name. In the storage device of the information processing device 150, information on each information device can be managed in association with identification information for identifying a corresponding information device. An instruction to delete device information using corresponding identification information as a key is generated. Then, device information corresponding to the identification information is deleted from among the device information for all of the local information devices, stored in the storage device of the information processing device 150.

In some embodiments, the information processing device 150 receives, from the device management apparatus 120, a request (acquisition request) for information (device information) on the local information device 194 managed by local connection control software 260 and receives, from the device management apparatus 120, an identifier (ID), which is generated from a USB port name and a serial number. In this case, in the storage device of the information processing device 150, the device information can be managed in association with the ID. An instruction to delete device information using a corresponding ID as a key is generated, and the corresponding device information is deleted from among the device information for all of the local information devices stored in the storage device of the information processing device 150.

In the flow illustrated in FIG. 5, the device management apparatus 120 detects that a time to start the periodic polling has come in S106. In S107, the device management apparatus 120 transmits a device information acquisition request to the information processing device 150. In S107, in addition to the information processing device 150, a device information acquisition request may be transmitted to the network information devices 114 and 116.

In S108, in response to the device information acquisition request, the local connection control software 260 of the information processing device 150 acquires information on the corresponding local information device 194 from the storage device. In S109, the local connection control software 260 of the information processing device 150 filters all of the device information to extract necessary device information, and then transmits the extracted device information to the device management apparatus 120. When the storage device of the information processing device 150 stores no device information related to the local information device 194, the information processing device 150 transmits, to device management apparatus 120, information indicating that there is no device information, which is stored in the storage device.

Figure 6:
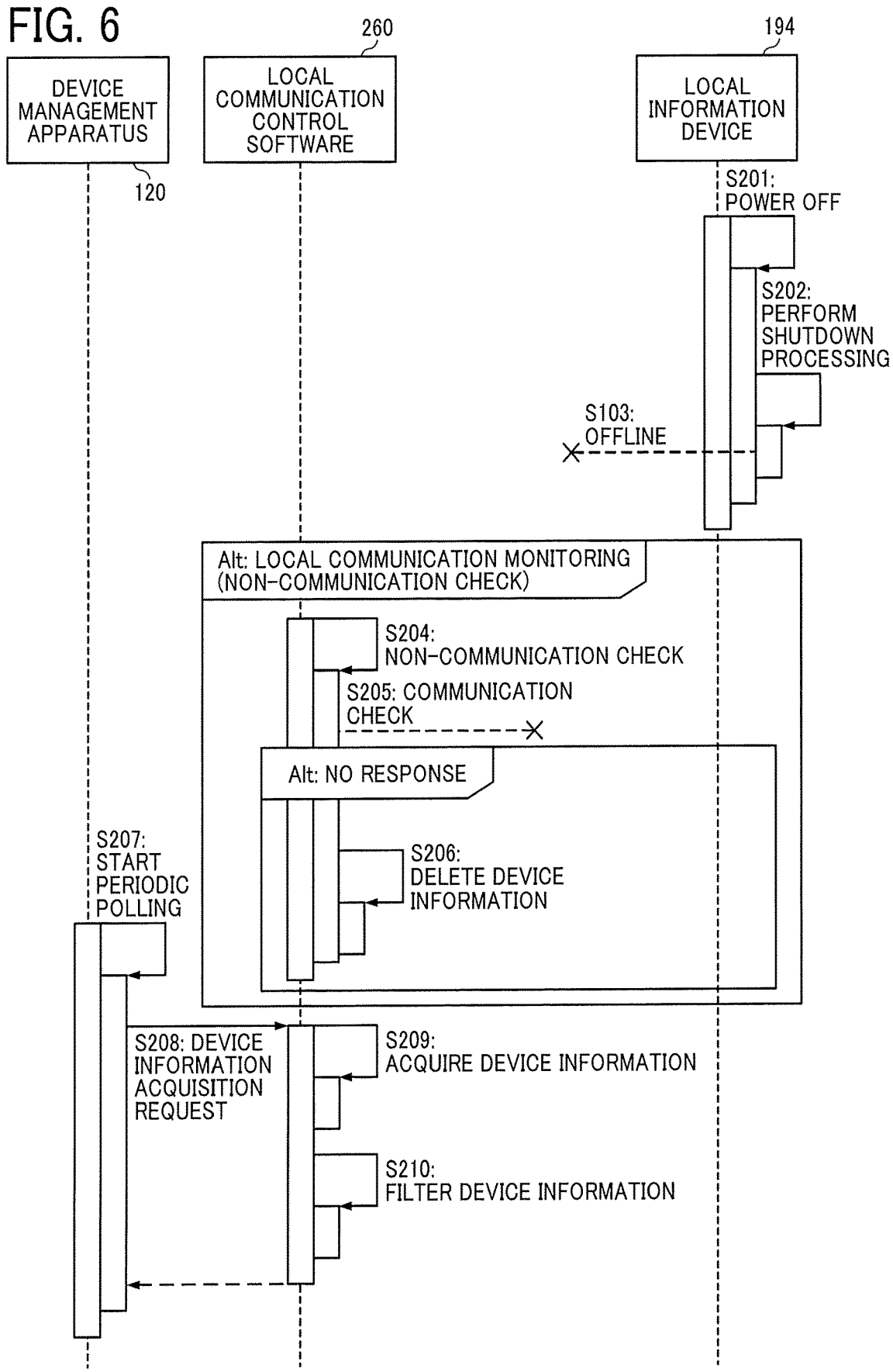
FIG. 6 is a sequence diagram illustrating a periodic polling process in which a connection state between an information processing device and a local information device is determined based on a non-communication check, in a device management system according to an embodiment of the disclosure.

FIG. 6 is a sequence diagram illustrating a periodic polling process in which a connection state between the information processing device 150 and the local information device 194 is determined based on a non-communication check, in the device management system 100 according to an exemplary embodiment. The non-communication check, or a communication check, is performed by the information processing device 150 in a manner that the information processing device 150 monitors a communication established between the information processing device 150 and the local information device 194 to determine whether the local information device 194 is online or offline.

The process illustrated in FIG. 6 is started when the power supply of the local information device 194 is turned off in S201. In S202, the local information device 194 performs shutdown processing, and in response to the processing, the local information device 194 becomes offline, without transmitting an offline notification to the information processing device 150, which is different from the process illustrated in FIG. 5 (Step S203).

In S204, the local connection control software 260 starts a periodic non-USB-communication check in preparation for a case where the offline notification could not be transmitted for some reason. In S204, the local connection control software 260 performs the communication check by the local communication monitoring unit 278 and detects the offline. When a reply in response to the communication check message is not received within a predetermined time, offline is detected.

In S206, the local connection control software 260 issues an instruction to cause the device information control unit 264 to delete, from the storage device, information on the local information device 194 related to the non-communication, resulting in deletion of the device information. The subsequent processing from S207 to S210 is substantially the same as the processing from S106 to S109 illustrated in FIG. 5.

FIG. 7 is a sequence diagram illustrating a periodic polling process in which a connection state between the information processing device 150 and the local information device 194 is determined based on a local communication disconnection event, in the device management system 100 according to an exemplary embodiment.

The process illustrated in FIG. 7 is started when the information processing device 150 detects that a cable used for connecting to the local information device 194 is disconnected in S301. The local connection control software 260 monitors a local communication disconnection event from the OS 252, in preparation for a case where the USB cable is disconnected for some reason. In S302, in the information processing device 150, the OS 252 notifies the local connection control software 260 of a local communication disconnection event, and the local communication monitoring unit 278 detects the local communication disconnection event.

In S303, the local connection control software 260 issues, in response to the local communication disconnection event, an instruction to cause the device information control unit 264 to delete information on the local information device 194 from the storage device, resulting in deletion of the device information. The subsequent processing from S304 to S307 is substantially the same as the processing from S106 to S109 illustrated in FIG. 5.

A description is now given of a periodic polling process in which a connection state between the information processing device 150 and the local information device 194 is determined based on an online notification from the local information device 194, in the device management system 100 according to an exemplary embodiment of the disclosure, with reference to FIG. 8. FIG. 8 is a sequence diagram illustrating the periodic polling process in which the connection state between the information processing device 150 and the local information device 194 is determined based on an online notification from the local information device 194, in the device management system 100 according to the exemplary embodiment of the disclosure.

The process illustrated in FIG. 8 is started when the power supply of the local information device 194 is turned on in S401. In S402, the local information device 194 performs start-up (activation) processing. In S403, the local information device 194 transmits an online notification to the information processing device 150. As an example of the online notification, a PJL command is used in a same manner as the offline notification described above.

In S404, in the information processing device 150, the OS 252 notifies the local connection control software 260 of an online event. In S405, the local connection control software 260 determines whether an ID included in the notification of the online event is identical to an ID stored in the external storage device (i.e., ID of the local information device related to previous device information). When the ID included in the notification of the online event is not identical to the ID stored in the external storage device, the local connection control software 260 determines that the local information device 194 is disconnected from the communication and issues an instruction to delete information on the local information device 194, resulting in deletion of the device information, which is the information on the disconnected local information device 194. This means that the storage device stores information indicating that there is no information on the local information device 194, accordingly.

In S406, the local connection control software 260 sets the local information device 194 to perform the periodic device information collection. As an example of a setting method, a PJL command, such as "@ PJL USTATUS DEVICEINFO=ON <CR><CF>", is used and transmitted to the local information device 194.

In S407, upon detecting that a time for the periodic device information collection has come, the local information device 194 collects information on the own device (local information device 194). In S408, the local information device 194 transmits the device information to the information processing device 150 to which the own device (local information device 194) is locally connected. In S409, the information processing device 150 stores the device information received from the local information device 194 in the storage device.

In S410, the device management apparatus 120 detects that a time to start the periodic polling has come. In S411, the device management apparatus 120 transmits a device information acquisition request to the local connection control software 260 of the information processing device 150. In S412, in response to the device information acquisition request, the local connection control software 260 acquires information on the corresponding local information device 194 from the external storage device. In S413, the local connection control software 260 of the information processing device 150 filters all of the device information to extract necessary device information, and then transmits the extracted device information to the device management apparatus 120.

Because this processing step is performed after the online event in the process illustrated in FIG. 8, the information on the local information device 194 is stored in the external storage device of the information processing device 150, and the device information is transmitted to the device management apparatus 120.

When the power supply of the local information device 194 is turned on, there is a case in which old device information remains in the external storage device of the information processing device 150. For example, when the local information device 194 is broken down, there may be a case in which the device is replaced, and the old device information may be transmitted to the device management apparatus 120 until a next time for the periodic device information collection comes. However, according to the flow illustrated in FIG. 8, identity of the local information device 194 connected to a port is determined, and when the identity is not confirmed, the corresponding device information is deleted. This prevents that the old device information is erroneously transmitted.

A description is now given of and a periodic polling process performed based on an instruction to turn on or off the power supply of the local information device 194 in the device management system 100 according to another embodiment, with reference to FIG. 9 (FIG. 9A and FIG. 9B). FIG. 9, which includes FIG. 9A and FIG. 9B, is a sequence diagram illustrating the periodic polling process performed based on an instruction to turn on or off a power supply of the local information device 194, in the device management system 100 according to an embodiment of the disclosure. In an exemplary embodiment, the information processing device 150 connected to the local information device 194 includes an information device power control unit to control the power supply of the local information device 194 based on the communication with the device management apparatus 120.

In S501, the device management apparatus 120 notifies the information processing device 150 of completion of the periodic polling. In S502, the local connection control software 260 on the information processing device 150 instructs the local information device 194 to turn off the power. In S503, the local information device 194 performs shutdown processing. In S504, the local information device 194 transmits an offline notification to the information processing device 150.

In S504, in the information processing device 150, the OS 252 notifies the local connection control software 260 of an offline event. In S506, the local connection control software 260 issues an instruction to delete, from the storage device, information on the local information device 194 related to the offline event, resulting in deletion of the device information.

In S507, the device management apparatus 120 instructs the information processing device 150 to start the periodic polling. In S508, the local connection control software 260 instructs the local information device 194 to turn on the power. In S509, the local information device 194 performs start-up processing. In S510, the local information device 194 transmits an online notification to the information processing device 150.

In S511, in the information processing device 150, the OS 252 notifies the local connection control software 260 of an online event. In S512, the local connection control software 260 determines whether an ID included in the notification of the online event is identical to an ID stored in the storage device (ID of the local information device related to previous device information). When the ID included in the notification of the online event is not identical to the ID stored in the external storage device, the local connection control software 260 issues an instruction to delete information on the local information device 194, resulting in deletion of the device information. In S513, the information processing device 150 sets the local information device 194 to perform the periodic device information collection.

In S514, upon detecting that a time for the periodic device information collection has come, the local information device 194 collects information on the own device. In S515, the local information device 194 transmits the device information to the information processing device 150 to which the own device is locally connected. In S516, the information processing device 150 stores the device information received from the local information device 194 in the external storage device.

In S517, the device management apparatus 120 detects that a time to start the periodic polling has come. In S518, the device management apparatus 120 transmits a device information acquisition request to the local connection control software 260 of the information processing device 150.

In S519, in response to the device information acquisition request, the local connection control software 260 acquires information on the corresponding local information device 194 from the external storage device. In S520, the local connection control software 260 filters all of the device information to extract necessary device information, and then transmits the extracted device information to the device management apparatus 120.

In the above description with reference to FIG. 5 to FIG. 9 (FIG. 9A and FIG. 9B), the information processing device 150 acquires information on the local information device 194 and transmits the acquired device information to the device management apparatus 120 in response to a request from the device management apparatus 120. However, in some embodiments, the device management apparatus 120 may manage the local information device 192 connected to the own device (device management apparatus 120). In such a case, a process is almost the same as the one illustrated in FIG. 10 in which the local information device 194 is replaced with the local information device 192, and that the execution entity of each process for the information device 192 is the device management apparatus 120 and device information is stored in an own storage device without transmitting the device information to the outside.

As described above, according to the above-described embodiments, the information processing device can manage information on an information device appropriately even when the connection state with the local information device locally connected changes.

According to an embodiment of the disclosure, an information processing device can appropriately manage information on an information device even when a connection state between the information processing device and the information device locally connected to the information processing device changes.

According to the embodiments described above, the connection state of an information device locally connected to the device management apparatus 120 or the information processing device 150 is determined, and when the connection state is a non-communication state (for example, offline, power off, cable disconnection, communication disconnection, etc.), information on the information device managed by the device management apparatus 120 or the information processing device 150 is deleted. This prevents that old device information is kept transmitting in response to an inquiry from the device management apparatus 120. The device management apparatus 120 can always acquire the latest device information, resulting in facilitating providing a service (maintenance, etc.) to the local devices.

In the above-described example embodiment, a computer can be used with a computer-readable program, described by object-oriented programming languages such as C++, C#, Java (registered trademark), or legacy programming languages such as machine language, assembler language, C language to control functional units used for the apparatus or system. The computer software can be provided to the programmable device using any storage medium or carrier medium for storing processor-readable code such as a floppy disk, a Compact Disk Read Only Memory (CD-ROM), a CD-Rewritable CD-(RW) a Digital Versatile Disk Read Only Memory (DVD-ROM), a DVD Recording only/Rewritable (DVD-R/RW), a Blu-ray disc, an Electrically Erasable and Programmable Read Only Memory (EEPROM), an Erasable Programmable Read Only Memory (EPROM), a memory card or stick such as USB memory, a memory chip, a Mini Disk (MD), a Magneto Optical disc (MO), magnetic tape, a hard disk in a server, a solid state memory device or the like, but not limited these.

Any one of the above-described operations may be performed in various other ways, for example, in an order different from the one described above. Although the embodiments of the disclosure have been described and illustrated above, such description is not intended to limit the disclosure to the illustrated embodiments. Numerous additional modifications and variations are possible in light of the above teachings. It is therefore to be understood that, within the scope of the appended claims, the disclosure of this patent specification may be practiced otherwise than as specifically described herein. As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. An information processing device, comprising:
    circuitry configured to
        determine a connection state between the information processing device and an information device locally connected to the information processing device, wherein the circuitry is further configured to determine whether the connection state is a first state or a second state, the first state being a state in which the information processing device and the information device are communicably connected to each other by one of a wired connection and a wireless connection and the information device is turned on, and the second state being one of a state in which communication between the information processing device and the information device by one of the wired connection and the wireless connection is disconnected and a state in which the information device is turned off;
        transmit, to a device management apparatus connected to the information processing device through a network, device information on the information device, which is acquired from the information device, when the connection state is the first state; and
        delete managed information of the information device managed by the information processing device without transmitting the managed information of the information device to the device management apparatus when the connection state is the second state different from the first state,
    wherein the circuitry is further configured to detect one of a first change that is a change in a wired or wireless communication state between the information processing device and the information device and a second change that is a change in a power state of the information device, and receive a notification of one of the first change and the second change to determine that the connection state becomes the second state.

2. The information processing device of claim 1, wherein the circuitry is further configured to determine that the connection state changes to the second state, when a specific information device for which an offline notification is received is identical to the information device managed by the information processing device.

3. The information processing device of claim 1, wherein the circuitry is further configured to control a power supply corresponding to the information device based on communication with the device management apparatus.

4. The information processing device of claim 1, wherein the circuitry is further configured to store the device information acquired from the information device in one of a memory of the information processing device and an external memory connected to the information processing device.

5. The information processing device of claim 1, wherein the circuitry is further configured to
    set the information device to collect the device information on the information device, and acquire, from the information device, the device information on the information device.

6. The information processing device of claim 1, further comprising a memory that stores information indicating that there is no device information on the information device after the connection state changes from the first state to the second state.

7. The information processing device of claim 6, wherein after the connection state changes from the first state to the second state, the circuitry is further configured to transmit, to the device management apparatus, in response to a request received from the device management apparatus for the device information on the information device, specific information indicating that there is no device information on the information device.

8. The information processing device of claim 1, wherein the information processing device and the information device are locally connected by a universal serial bus connection.

9. The information processing device of claim 1, wherein the circuitry is further configured to acquire the device information from the information device periodically when the connection state is the first state.

10. A device management apparatus, comprising:
    circuitry configured to
        determine a connection state between the device management apparatus and an information device locally connected to the device management apparatus, wherein the circuitry is further configured to determine whether the connection state is a first state or a second state, the first state being a state in which the device management apparatus and the information device are communicably connected to each other by one of a wired connection and a wireless connection and the information device is turned on, and the second state being one of a state in which communication between the device management apparatus and the information device by one of the wired connection and the wireless connection is disconnected and a state in which the information device is turned off;

store, in a memory, device information on the information device, which is acquired from the information device when the connection state is the first state; and delete managed information of the information device managed by the device management apparatus without transmitting the managed information out of the device management device when the connection state is the second state different from the first state, wherein the circuitry is further configured to detect one of a first change that is a change in a wired or wireless communication state between the device management apparatus and the information device and a second change that is a change in a power state of the information device, and receive a notification of one of the first change and the second change to determine that the connection state becomes the second state.

11. A control method, comprising:

determining a connection state between an information processing device and an information device locally connected to the information processing device, wherein the circuitry is further configured to determine whether the connection state is a first state or a second state, the first state being a state in which the information processing device and the information device are communicably connected to each other by one of a wired connection and a wireless connection and the information device is turned on, and the second state being one of a state in which communication between the information processing device and the information device by one of the wired connection and the wireless connection is disconnected and a state in which the information device is turned off;

transmitting, to a device management apparatus connected to the information processing device through a network, information on the information device acquired from the information device when the connection state is the first state; and deleting managed information of the information device managed by the information processing device without transmitting the managed information of the information device to the device management apparatus when the connection state is the second state different from the first state, wherein the method further comprises detecting one of a first change that is a change in a wired or wireless communication state between the information processing device and the information device and a second change that is a change in a power state of the information device, and receiving a notification of one of the first change and the second change to determine that the connection state becomes the second state.

\* \* \* \* \*